Jan. 3, 1928.

H. E. NIETSCHE

ELECTRIC MOTOR

Filed April 13, 1925  3 Sheets-Sheet 1

1,655,286

Inventor:
Hans E. Nietsche
By
Attorneys.

Jan. 3, 1928.

H. E. NIETSCHE 1,655,286

ELECTRIC MOTOR

Filed April 13, 1925    3 Sheets-Sheet 2

Inventor:
Hans E. Nietsche
By
Attorneys.

Jan. 3, 1928.  1,655,286

H. E. NIETSCHE

ELECTRIC MOTOR

Filed April 13, 1925      3 Sheets-Sheet 3

Inventor:
Hans E. Nietsche

Patented Jan. 3, 1928.

1,655,286

UNITED STATES PATENT OFFICE.

HANS E. NIETSCHE, OF DETROIT, MICHIGAN.

ELECTRIC MOTOR.

Application filed April 13, 1925. Serial No. 22,681.

This invention relates to electric motors, more particularly of the portable type adapted to be utilized with small storage batteries of low voltage, such as the common 6 or 12 volt battery in very general use, for which purpose small motors have been heretofore produced, but have generally been of very low efficiency so they have not been adopted to the extent which would otherwise have been the case had reasonable efficiency been secured.

The invention, therefore, has as its object to provide a low voltage motor having a rotating field and a stationary armature admitting of a shorter yoke than is usual but with a large yoke cross section, and also admitting of large air gap area and diameter relative to the size of the motor; the advantages of which will be fully appreciated by those conversant with the art to which this invention appertains.

The invention still further aims to secure, by reason of the novel constructon thereof, lower magnetizing ampere turns, together with low copper loss, and also to secure comparatively high efficiency at the lower speeds as compared with low voltage motors designed according to the general practice.

An improved feature of the invention is the provision on the armature teeth and field poles, of extended shoes projecting laterally and longitudinally of the said teeth and poles, whereby the sectional area of the teeth and poles proper is substantially small in proportion to the resulting air gap area and whereby provision is made for the accommodation of windings beneath the said projecting shoes with consequent compactness and the enabling of a smaller rotor to be used than is usual in a motor having equal specifications as to power, speed and efficiency.

A further object is to effect, by the unique design of armature and field and the provision of overhanging shoes on the armatured teeth and field poles resulting in large air gap area, a reduction of the magnetizing current and consequent reduction in the number of field turns required in the winding.

A still further object is to ensure the securing, in all positions of the rotor, of an opening between the teeth of the armature being always interposed between adjacent pole shoes whereby leakage of flux between the pole shoes is prevented with consequent minimizing of magnetic hum, and whereby a continuous pull, even at low speeds, may be secured.

Still further objects subsidiary to, or resulting from, the aforesaid objects, or from the construction or operation of the invention as it may be carried into effect, will become apparent as the said invention is hereinafter fully disclosed.

In carrying the said invention into effect I may provide a low voltage motor wherein the field is rotatable within a surrounding stationary armature, the teeth of the armature and the pole pieces of the field being extended longitudinally and also laterally thereof, so that they have substantially overhanging extensions at the ends thereof, which greatly increase the area beyond that of the armatured teeth and pole pieces proper, and consequently provide large air gap diameter and air gap area.

All, or a substantial part, of the windings of the motor are housed beneath the said extending portions of the pole pieces, a reduction in the number of turns in such windings relative to the air gap area being utilized comparative with the number of turns which would be required were the cross section of the iron in the said teeth and pole pieces in the proportion to the air gap area commonly employed; disk type commutator and contact plates being utilized against which longitudinally extending brushes engage.

All of which is more particularly described and ascertained hereinafter, by way of example, having reference to the accompanying drawings, wherein:—

Similar characters of reference indicate similar parts in the several figures of the drawings.

Figure 7:
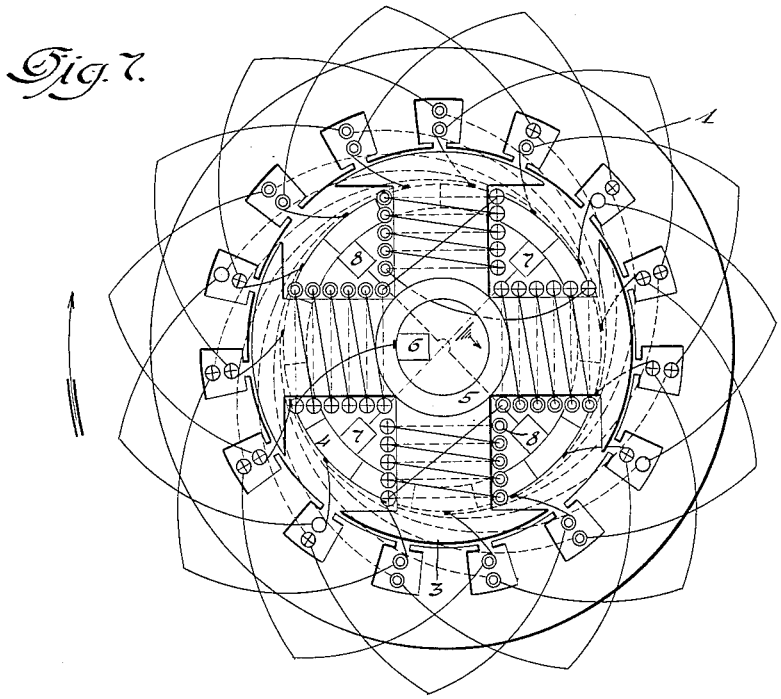
Figure 7 is a schematic wiring diagram of the motor illustrated in Figure 1.

Referring to Figures 1 to 5, and also to the wiring diagram, Figure 7, the motor is illustrated as having a fixed armature, generally numbered 1, carried by the casing 2, and a field rotor, generally numbered 3, within the said armature, 4 being a segmental commutator disk situated in one end of the lower casing, and 5 a contact ring carried by one end of the rotor. 6 indicates an input brush mounted in the terminal 6a and engaging the contact ring 5, 7 being commutator brushes grounded through the said rotor, and 8 commutator brushes connected to the inner end of the field windings.

The teeth 9 of the armature are all of very moderate cross sectional configuration intermediate their height so that substantial wiring space 10 is left therebetween, and the ends of the teeth are provided with shoes 11, which project laterally thereof, as at 12, and also longitudinally thereof, as at 13, so that the cross sectional area of each tooth is very much less than the area of the shoe which has, in the illustrated case, approximately three times the longitudinal dimension of the tooth and twice the transverse dimension. This will be very apparent from an examination of Figure 5.

It will be seen that this extended arrangement of the shoes of the armature teeth permits of the armature windings 14 being located behind the projecting parts of the shoe where such projecting parts are of sufficient dimensions to admit of this.

The rotor 3 is similarly formed with its shoes 15 projecting to a substantial extent longitudinally and transversely, as at 16 and 17, of the pole pieces 18, so that the field windings 19 are accommodated beneath the projecting portions of the said shoes; and by this construction a very large area is given the shoes relative to the cross sectional area of the pole pieces so that a correspondingly large air gap is secured between the pole shoes of the rotor and the shoes of the armature teeth, permitting a low magnetizing current and greatly reducing the number of magnetizing ampere turns required in the field coils.

As a result of these features, a smaller rotor is possible to meet a given specification as to power, speed, and efficiency than is usual, and consequently a reduction of the overall size and weight of the motor relevant to the output for a given power and speed may be secured.

As shown, the armature may have a laminated core 20 and the field rotor a laminated core 21, 22 being the end plates of the armature which are provided with the extensions 13 hereinbefore referred to, and 23 the end plates of the core of the rotor, which are provided with the extension 16, also hereinbefore referred to.

Figures 1, 2, 3, 4:
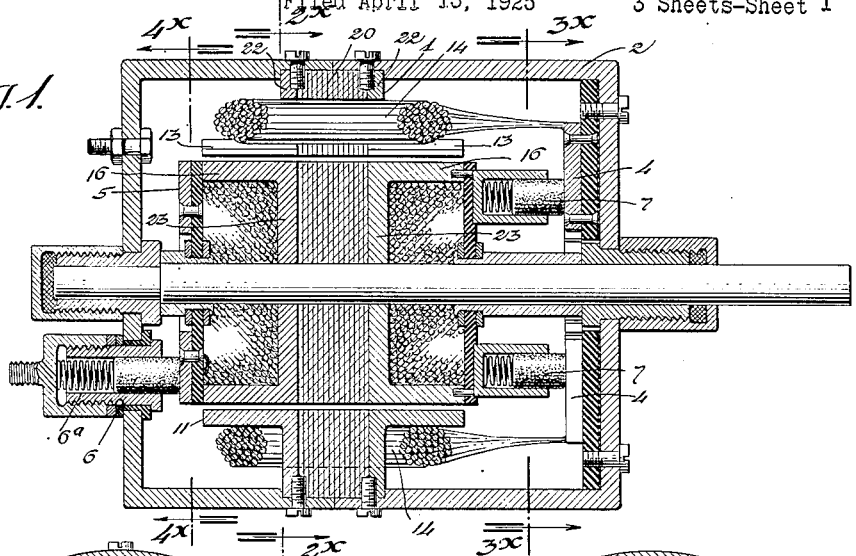
Figure 1 is a longitudinal section of a motor embodying this invention.
Figure 2 is a transverse section of the same taken on the line $2^x$—$2^x$, Figure 1.
Figure 3 is a transverse section of the same taken on the line $3^x$—$3^x$, Figure 1.
Figure 4 is a transverse section of the same taken on the line $4^x$—$4^x$, Figure 1.
Figure 5:
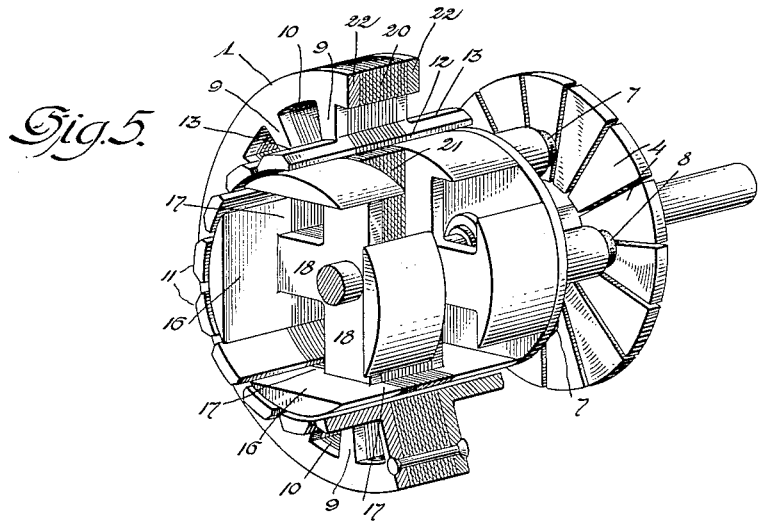
Figure 5 is a fragmentary, perspective detail view of the armature field and commutator of the motor with the windings removed.

In the design shown, there are four pole shoes on the rotor, each having an arcuate span approximating that of three of the teeth of the armature, and as there are fifteen teeth in the armature, there will at all positions of the rotor be an opening between the teeth of the armature interposed between adjacent pole shoes of the rotor, as at a in Figure 2, preventing leakage of flux between the pole shoes and ensuring a continuous pull between the armature and rotor, even at low speeds, which pull has not been readily attainable in small low voltage motors.

Figure 8:
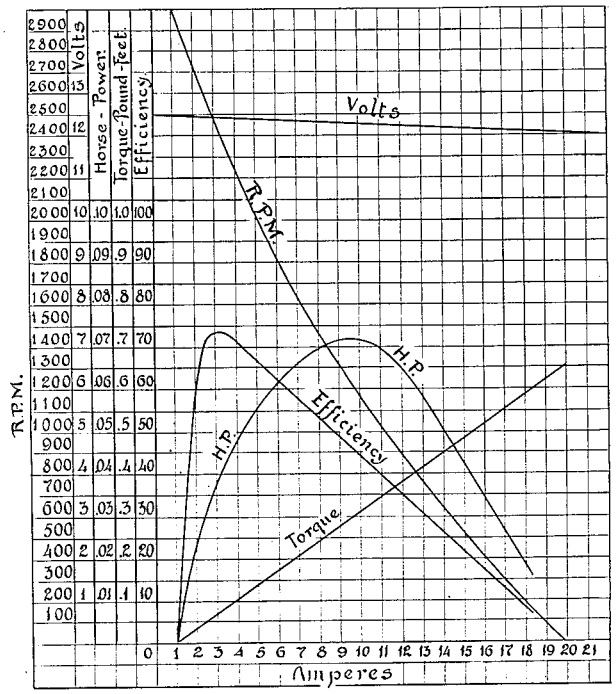
Figure 8 is a performance diagram illustrating the operation of a motor constructed in accordance with this invention.

The functioning of a motor constructed in accordance with this invention and having a weight of four pounds is graphically illustrated in Figure 8, which indicates the merit lying in such a construction, although it is to be understood that this diagram does not indicate the full efficiency obtainable from such construction, as, by more careful design and balancing of the armature and field structures than was resorted to in the carrying out of the tests resulting in this graph, a correspondingly better showing will be obtained. It is, however, pointed out that this small motor was operated drawing seven amperes with a fully enclosed casing and without any cooling means, at a speed of 1620 R. P. M. and showing an efficiency of almost 60%, which is considered to be unusual in small motors of this type.

Figure 6:
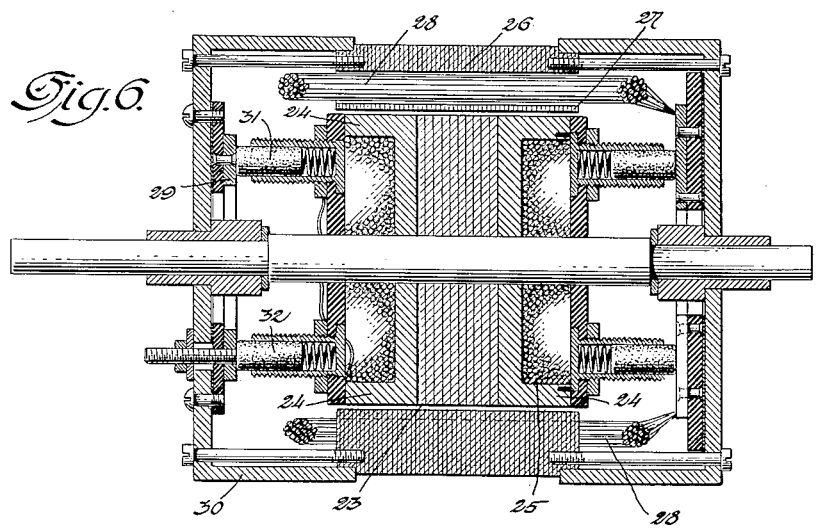
Figure 6 is a similar view to Figure 1, illustrating a modified form of the device.

The modified form shown in Figure 6 utilizes the form of rotor having overhanging pole shoes as described in connection with the other figures of the drawing, but dispenses with the form of armature teeth heretofore described. In the said Figure 6 the rotor is generally numbered 23 and has its pole shoes 24 overhanging the poles in the same manner as already described, so that the field windings 25 are substantially beneath the pole shoes as shown. 26 is the stationary armature, the shoes 27 of which do not in this case project longitudinally of the armature, so that the armature windings 28 are not overlapped by the shoes to the same extent as in the previously described arrangement. 29 is the ring contact member which in this case is carried by the casing 30, and the input brushes 31 and 32 are carried by the rotor instead of by the casing as is the corresponding brush 6 in Figure 1.

The improved form of motor lends itself readily to the operation of portable devices in connection with which storage or other low voltage batteries are used as a source of energy, so that such a motor may be readily adapted to drive motor boats, canoes, phonographs, or other machines or devices, its field of usefulness being very extensive and its cost of operation not excessive.

This invention may be developed within the scope of the following claim without departing from the essential features of the said invention and it is desired that the specification and drawings be read as being merely illustrative and not in a limiting sense, except as necessitated by the prior art.

What I claim is:

In an electric motor, a rotary field, a fixed armature encircling said field, said armature comprising a laminated core, and plates at each end of said core forming therewith the teeth of said armature, the inner ends of said end plates extending outwardly of said teeth in the form of longitudinally disposed projections, and windings passing beneath said outwardly extending upper ends of the end plates.

In testimony whereof I affix my signature.

HANS E. NIETSCHE.